J. MURRAY.
PUMP.
APPLICATION FILED OCT. 18, 1911.

1,012,896.

Patented Dec. 26, 1911.

Witnesses

Jasper Murray,
Inventor by C. A. Snow & Co.
Attorneys

UNITED STATES PATENT OFFICE.

JASPER MURRAY, OF HUCKABAY, TEXAS.

PUMP.

1,012,896.  Specification of Letters Patent.  Patented Dec. 26, 1911.

Application filed October 18, 1911. Serial No. 655,339.

*To all whom it may concern:*

Be it known that I, JASPER MURRAY, a citizen of the United States, residing at Huckabay, in the county of Erath and State of Texas, have invented a new and useful Pump, of which the following is a specification.

This invention relates to pumps, its principal object being to provide means whereby leakage of air past the piston is prevented and the efficiency of the pump increased.

A further object is to provide a pump in which the force of the piston is transmitted to the liquid to be elevated, through confined bodies of air and liquid, the said liquid bodies being preferably made up of oil and operating to prevent loss of power by leakage past the piston.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings, the preferred form of the invention has been shown.

Figure 1:
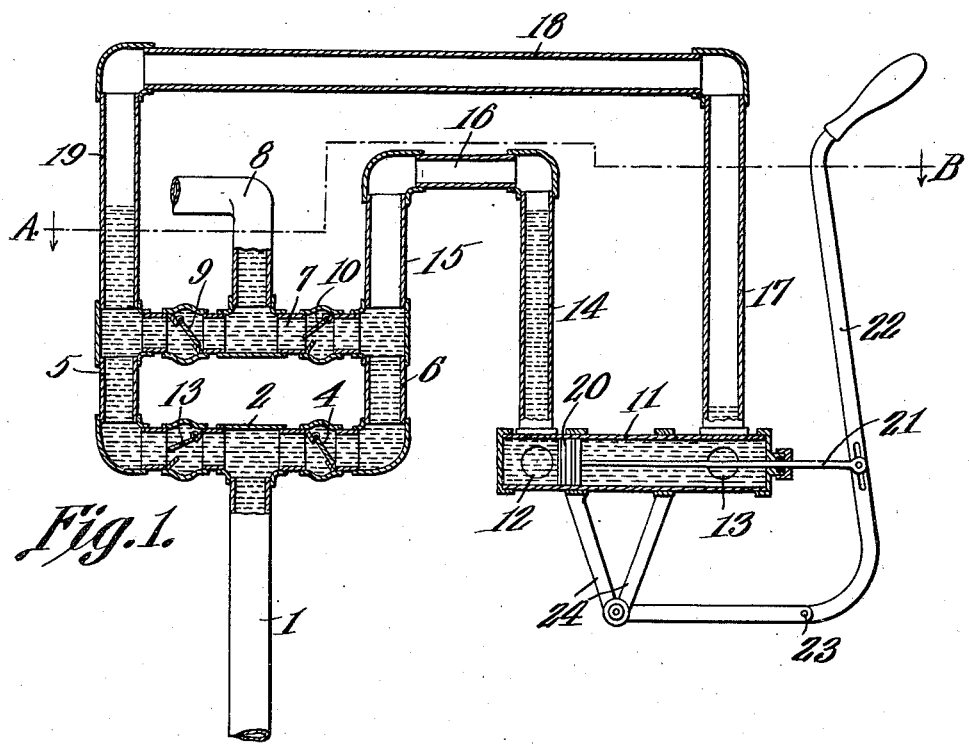
Figure 2:
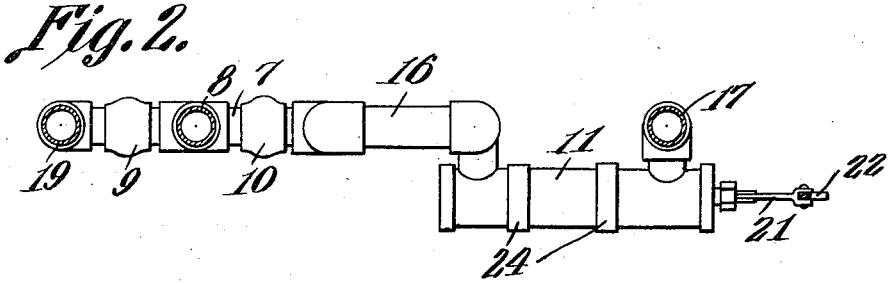

In said drawings:—Figure 1 is a section through a pump constructed in accordance with the present invention. Fig. 2 is a section on line A—B Fig. 1.

Referring to the figures by characters of reference 1 designates a feed pipe opening into a lower casing 2 having check valves 3 and 4 mounted in the end portions thereof and adapted to prevent back or return flow of liquid into the casing 2 and thence into the feed pipe 1. Pipes 5 and 6 extend upwardly from the ends of the casing 2 and open into ends of an upper casing 7 from which the outlet pipe 8 extends, this upper casing 7 being provided, in the end portions thereof, with check valves 9 and 10 adapted to prevent downward flow of liquid from pipe 8 into casing 7 and thence into the pipes 5 and 6. A cylinder 11 is mounted close to the casings 2 and 7 and has ports 12 and 13 in one side thereof close to its ends. A pipe 14 extends upwardly from the port 12 and another pipe 15 extends upwardly from one end of the casing 7, these two pipes 14 and 15 being connected by a cross pipe 16. Another pipe 17 extends upwardly from the port 13 and is connected, by means of a cross pipe 18 to a pipe 19 extending upwardly from the other end of the casing 7. A piston 20 is mounted to reciprocate within the cylinder 11 and is connected, as by means of a rod 21, to a lever 22 pivotally connected to a link 23 which, in turn, is pivoted to a bracket 24 extending from the cylinder 11.

It is to be understood that the cylinder 11 is to be filled with oil and that the pipe 14 and 17 are to be partially filled therewith, there being enough oil at each side of the piston 20 to more than fill the cylinder back of the piston when said piston reaches either limit of its movement. This oil, which is preferably lubricating oil will, obviously, practically seal the space around the piston and thus prevent loss of energy during the actuation of the piston. When piston 20 is moved in one direction, the oil within the pipe 17 will be drawn downwardly into cylinder 11 and back of the piston, thus creating a suction through pipes 18 and 19 and causing water to be drawn upwardly from pipe 1 into casing 2 and then past the valve 3 into the pipes 5 and 19. At the same time the oil in the path of the piston 20 will be forced upwardly through port 12 into pipe 14, thus driving the air in the pipes 15 and 16 against the water trapped above the closed valve 4. This water will therefore be forced against valve 10 so as to open it and will then flow outwardly through the pipe 8. When the piston 20 is moved in the opposite direction, the foregoing operation will be reversed, the water elevated into the pipes 5 and 19 being expelled through casing 7 by way of opened valve 9 and into the outlet pipe 8 while an additional supply of water is elevated into the pipes 6 and 15.

By so arranging the parts of the pump as to permit the use of bodies of oil and air for transmitting pressure from the piston to the water to be elevated, the danger of injuring the valves and adjacent parts of the pump is materially reduced for the reason that the confined bodies of air act as cushions and thus prevent excessive sudden impact of the water against the parts of the pump.

What is claimed is:—

1. A pump including upper and lower casings communicating at their ends, a feed pipe opening into the lower casing, an outlet pipe extending from the upper casing, check valves within the ends of the lower casing for preventing return flow of liquid, into the feed pipe, check valves within the end portions of the upper casing for preventing return flow of water from the outlet pipe, a cylinder, pipes upstanding from the end portions thereof and opening thereinto, said pipes and cylinder constituting oil containing means, a piston mounted to reciprocate within the cylinder, and tubular connections between the upper ends of said upstanding pipes and the ends of the casings.

2. A pump including upper and lower casings, said casings communicating at their ends, valves within the casings for preventing downward flow of liquid after passing through the casings, a feed pipe opening into the lower casing, an outlet pipe extending from the upper casing, a cylinder, upstanding pipes opening into the ends of the cylinder, said cylinder and pipes constituting oil containing means, pipes upstanding from the casings, tubular connections between the upstanding pipes of the casings and cylinder, a piston within the cylinder, and means for reciprocating the piston to elevate oil successively in the upstanding pipes of the cylinder, there being an air space within the tubular connections and within the upper portions of the upstanding pipes.

In testimony that I claim the foregoing as my own, I have hereto affixed my signature in the presence of two witnesses.

JASPER MURRAY.

Witnesses:
J. M. DANNE,
W. M. STEWART.

Copies of this patent may be obtained for five cents each, by addressing the "Commissioner of Patents, Washington, D. C."